(12) United States Patent
Ayanbadejo et al.

(10) Patent No.: US 11,423,564 B2
(45) Date of Patent: Aug. 23, 2022

(54) BODY MODELING USING MOBILE DEVICE

(71) Applicant: HealthReel, Inc., Baltimore, MD (US)

(72) Inventors: Obafemi Devin Ayanbadejo, Baltimore, MD (US); Michael Peven, Baltimore, MD (US)

(73) Assignee: HealthReel, Inc., Baltimore, MD (US)

( * ) Notice: Subject to any disclaimer, the term of this patent is extended or adjusted under 35 U.S.C. 154(b) by 45 days.

(21) Appl. No.: 16/697,927

(22) Filed: Nov. 27, 2019

(65) Prior Publication Data

US 2020/0175710 A1    Jun. 4, 2020

Related U.S. Application Data

(60) Provisional application No. 62/774,138, filed on Nov. 30, 2018, provisional application No. 62/940,490, filed on Nov. 26, 2019.

(51) Int. Cl.
| | |
|---|---|
| *G06K 9/00* | (2022.01) |
| *G06T 7/62* | (2017.01) |
| *G06T 7/11* | (2017.01) |
| *G06T 7/70* | (2017.01) |
| *G06T 15/08* | (2011.01) |
| *G06T 3/20* | (2006.01) |
| *G06V 20/40* | (2022.01) |
| *G06V 40/10* | (2022.01) |

(52) U.S. Cl.
CPC ............... *G06T 7/62* (2017.01); *G06T 3/20* (2013.01); *G06T 7/11* (2017.01); *G06T 7/70* (2017.01); *G06T 15/08* (2013.01); *G06V 20/46* (2022.01); *G06V 20/49* (2022.01); *G06V 40/10* (2022.01); *G06T 2200/24* (2013.01); *G06T 2207/10016* (2013.01); *G06T 2207/30196* (2013.01)

(58) Field of Classification Search
CPC ............................................. G06T 2207/30196
See application file for complete search history.

(56) References Cited

U.S. PATENT DOCUMENTS

| | | | | |
|---|---|---|---|---|
| 7,257,237 | B1* | 8/2007 | Luck | A61B 5/1113 382/103 |
| 8,334,877 | B2* | 12/2012 | Saed | H04N 5/2624 345/619 |
| 2005/0265583 | A1* | 12/2005 | Covell | G06K 9/00375 382/103 |
| 2011/0081045 | A1* | 4/2011 | Lee | G06T 7/251 382/103 |
| 2014/0072170 | A1* | 3/2014 | Zhang | G06K 9/00624 382/103 |
| 2015/0168238 | A1* | 6/2015 | Raut | G01N 27/223 702/42 |
| 2016/0071284 | A1* | 3/2016 | Kontschieder | G06N 20/00 382/107 |
| 2018/0047192 | A1* | 2/2018 | Kristal | G06Q 30/0643 |
| 2020/0098175 | A1* | 3/2020 | Chen | A63F 13/428 |

* cited by examiner

*Primary Examiner* — Hadi Akhavannik
(74) *Attorney, Agent, or Firm* — Cygnet IP Law, P.A.; Stephen W. Aycock, II

(57) ABSTRACT

Methods, systems and computer readable media for computerized modeling of a subject (e.g., a human body) are described.

17 Claims, 6 Drawing Sheets

BODY MODELING USING MOBILE DEVICE

RELATED APPLICATIONS

This application claims the benefit of U.S. Application No. 62/940,490, entitled "BODY MODELING USING MOBILE DEVICE" and filed on Nov. 26, 2019 and U.S. Application No. 62/774,138, entitled "3-D BODY MODELING," and filed on Nov. 30, 2018, which are incorporated herein by reference in their entirety.

TECHNICAL FIELD

Embodiments relate generally to computer image processing, and more particularly, to methods, systems and computer readable media for generating a computer model of a subject (e.g., a human body) from one or more computer images (e.g., video frames and/or still pictures).

BACKGROUND

Some attempts have been made to develop systems for computerized modeling of a human body. However, the existing systems may suffer from one or more limitations. For example, some existing systems for modeling the human body may rely on large and/or complicated hardware setups that include things such as multi-camera photogrammetry, IR-depth scanning, lidar, and/or arrays of markers applied to the body of a subject being measured. These systems may frequently require the subject to travel to a scanning location, spending significant time and resources to do so, and spending significant time to set up the hardware or outfit the subject for measurement. The initial capital expenditure to acquire the necessary hardware may be significant, as is the expertise to set up, use, and maintain the hardware.

Some emerging methods may use neural networks to determine body measurements. However, these methods may be hampered by a lack of appropriate training data and/or flawed assumptions about human body uniformity. These are less expensive than the larger setups, but their inherent biases about body shape may not account for the large variability in the shapes of people across the planet.

Embodiments were conceived in light of the above-mentioned needs, problems and/or limitations, among other things.

SUMMARY

In general, some implementations can provide a method comprising receiving, at one or more processors, digital media as input, and separating, using the one or more processors, the digital media into a plurality of individual image frames. The method can also include selecting, using the one or more processors, a group of one or more image frames from the plurality of individual image frames, and for each individual image frame in the group of one or more image frames, performing a process including identifying one or more joints of a human body subject image within the image frame, and identifying human body regions within the image frame. The method can further include segmenting the image frame to remove any image features that are not parts of the human body subject image and aligning the human body subject image within the image frame. The method can also include generating a silhouette of the human body subject image within the image frame and determining one or more orientations of the human body subject based on the image frame.

The method can further include building a voxel model of the human body subject based on the silhouette and the orientation of the human body subject image in one or more of the plurality of individual image frames. The method can also include computing a measurement of at least one portion of the human body subject at one or more locations on the voxel model of the human body subject based on the voxel model of the human body subject.

In some implementations, the digital media can include a video. Determining one or more orientations of the human body subject based on the image frame can be based on an area of the human body subject image relative to the image frame.

Aligning can include adjusting for vertical or horizontal movement of the human body subject image from one frame to another and centering the human body subject image within the frame. Building a voxel model of the human body subject can further include adjusting the voxel model based on a rotational speed of the human body subject, wherein the rotational speed is determined based on a timing of when the one or more orientations appear in the plurality of individual image frames.

Computing the measurement of the at least one portion can be further based on a measurement of the human body subject. In some implementations, the measurement can include height of the human body subject. In some implementations, the measurement can be received via a graphical user interface.

The method can also include disposing of the digital media and the plurality of individual image frames and retaining the voxel model. The method can further include transmitting the voxel model to a data collection system.

Some implementations can include a method. The method can include receiving, at one or more processors, a video that includes a plurality of image frames in a sequence as input, and separating, using the one or more processors, the video into a plurality of individual image frames. The method can also include selecting a group of one or more image frames from the plurality of individual image frames.

The method can further include for each individual image frame in the group of one or more image frames, performing operations including: identifying human body regions corresponding to a human body subject within the image frame, segmenting the image frame to remove image features that are not parts of the human body subject, aligning the human body subject within the image frame, wherein the aligning includes adjusting for vertical or horizontal movement of the human body subject from one frame to another and centering the human body subject image within the frame, generating a silhouette of the human body subject within the image frame, and determining one or more orientations of the human body subject based on the image frame.

The method can also include determining a location of a waistline of the human body subject in the image frame based on the one or more orientations and projecting an ellipse from the human body subject based on a rotation of the silhouette of the human body subject. The method can further include fitting an ellipse equation to the projected ellipse and determining an estimated waistline perimeter for the human subject based on the ellipse equation. In some implementations, projecting the ellipse includes projecting one or more individual waist diameters onto a plane about an origin such that the one or more individual waist diameters can be fit to an ellipse using least-squares to determine an ellipse approximating waistline perimeter.

In some implementations, determining one or more orientations of the human body subject is based on an area of the human body subject in a first image frame and a second image frame. In some implementations, aligning includes adjusting for vertical or horizontal movement of the human body subject image between a plurality of frames of the video and centering the human body subject image within the frame.

The method can also include receiving one or more demographic information items corresponding to the human body subject and retrieving an estimated demographic waistline perimeter from a data store based on the one or more demographic information items. The method can further include generating an adjusted estimated waistline perimeter by adjusting the estimated waistline perimeter based on the estimated demographic waistline perimeter.

In some implementations, the adjusting includes determining a mathematical mean of the estimated waistline perimeter and the estimated demographic waistline perimeter. In some implementations, determining a location of a waistline of the human body subject is based a measurement of the human body subject.

In some implementations, the measurement includes height of the human body subject. In some implementations, the measurement is received via a graphical user interface. The method can also include deleting the video and the plurality of individual image frames and retaining the estimated waistline perimeter or adjusted estimated waistline perimeter.

Some implementations can include a system comprising a memory and a processing device, coupled to the memory. The processing device is configured to perform operations including receiving, at one or more processors, a video that includes a plurality of image frames in a sequence as input and separating, using the one or more processors, the video into a plurality of individual image frames. The operations can also include selecting a group of one or more image frames from the plurality of individual image frames.

The operations can further include, for each individual image frame in the group of one or more image frames, performing operations including: identifying human body regions corresponding to a human body subject within the image frame, segmenting the image frame to remove image features that are not parts of the human body subject, aligning the human body subject within the image frame, wherein the aligning includes adjusting for vertical or horizontal movement of the human body subject from one frame to another and centering the human body subject image within the frame, generating a silhouette of the human body subject within the image frame, and determining one or more orientations of the human body subject based on the image frame.

The operations can also include determining a location of a waistline of the human body subject in the image frame based on the one or more orientations and projecting an ellipse from the human body subject based on a rotation of the silhouette of the human body subject. The operations can further include fitting an ellipse equation to the projected ellipse and determining an estimated waistline perimeter for the human subject based on the ellipse equation.

In some implementations, projecting the ellipse includes projecting one or more individual waist diameters onto a plane about an origin such that the one or more individual waist diameters can be fit to an ellipse using least-squares to determine an ellipse approximating waistline perimeter. In some implementations, aligning includes adjusting for vertical or horizontal movement of the human body subject image between a plurality of frames of the video and centering the human body subject image within the frame.

The operations can further include receiving one or more demographic information items corresponding to the human body subject and retrieving an estimated demographic waistline perimeter from a data store based on the one or more demographic information items. The operations can also include generating an adjusted estimated waistline perimeter by adjusting the estimated waistline perimeter based on the estimated demographic waistline perimeter.

The operations can further include deleting the video and the plurality of individual image frames and retaining the estimated waistline perimeter or adjusted estimated waistline perimeter.

Some implementations can include a non-transitory computer-readable medium comprising instructions that, responsive to execution by a processing device, cause the processing device to perform operations. The operations can include receiving, at one or more processors, a video that includes a plurality of image frames in a sequence as input and separating, using the one or more processors, the video into a plurality of individual image frames. The operations can also include selecting a group of one or more image frames from the plurality of individual image frames.

The operations can further include, for each individual image frame in the group of one or more image frames, performing operations including: identifying human body regions corresponding to a human body subject within the image frame, segmenting the image frame to remove image features that are not parts of the human body subject, aligning the human body subject within the image frame, wherein the aligning includes adjusting for vertical or horizontal movement of the human body subject from one frame to another and centering the human body subject image within the frame, generating a silhouette of the human body subject within the image frame, and determining one or more orientations of the human body subject based on the image frame.

The operations can also include determining a location of a waistline of the human body subject in the image frame based on the one or more orientations and projecting an ellipse from the human body subject based on a rotation of the silhouette of the human body subject. The operations can further include fitting an ellipse equation to the projected ellipse and determining an estimated waistline perimeter for the human subject based on the ellipse equation.

In some implementations, projecting the ellipse includes projecting one or more individual waist diameters onto a plane about an origin such that the one or more individual waist diameters can be fit to an ellipse using least-squares to determine an ellipse approximating waistline perimeter. In some implementations, aligning includes adjusting for vertical or horizontal movement of the human body subject image between a plurality of frames of the video and centering the human body subject image within the frame.

The operations can further include receiving one or more demographic information items corresponding to the human body subject and retrieving an estimated demographic waistline perimeter from a data store based on the one or more demographic information items. The operations can also include generating an adjusted estimated waistline perimeter by adjusting the estimated waistline perimeter based on the estimated demographic waistline perimeter.

The operations can further include deleting the video and the plurality of individual image frames and retaining the estimated waistline perimeter or adjusted estimated waistline perimeter.

DETAILED DESCRIPTION

Figure 1:
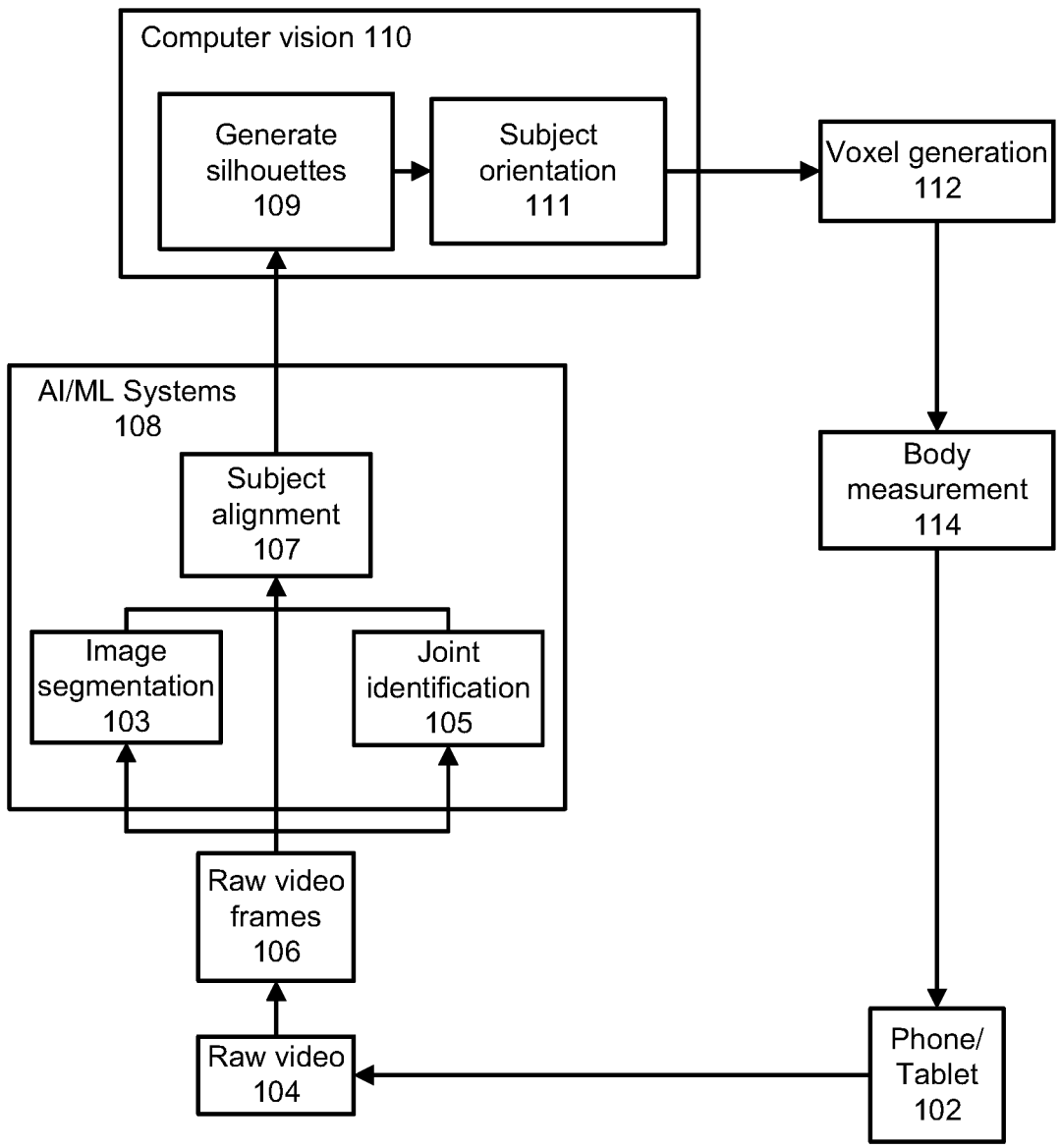
FIG. 1 is a diagram of an example data flow and computational environment for body modeling in accordance with some implementations.

In general, some implementations can include a combination of computer vision and neural networks that, when combined, create enough information to generate a model of an input subject, such as a person, which can then be used in various ways, such as taking measurements or rigging for character animation.

In some implementations, input, from a video stream or file, is received and separated into frames. Selected frames can then sent through a processing pipeline where several processes take place.

In one implementation, an a 2-D modelling technique to estimate a measurement of a portion of a subject body portion (e.g., waistline or other portion) can be determined. The 2-D modeling technique can include:

a. Joint Identification: e.g., programmatically determining where various human joints are in the body, and programmatically identifying regions (e.g., belly, thighs, arms, etc.).

b. Image segmentation: e.g., removing from a frame anything that isn't the subject.

c. Subject alignment: e.g., as the subject drifts up/down or side-to-side, center them within each frame.

d. With the background being removed, and the subject centered, generate a silhouette.

e. Based on the overall area taken up in the silhouette image by the subject, determine the subject's orientation relative to the camera.

f. (1) locating a predicted waistline portion of the subject body image using input silhouettes and known orientations.

f. (2) Based on timing of identified/known orientations (e.g., which provides an estimation of rotational speed), projecting an ellipse representing the waistline of the subject body.

g. Optionally, fit the ellipse estimate to an ellipse equation.

h. Estimate a waistline perimeter using the ellipse equation (or projected ellipse).

i. Optionally, adjust the estimated waistline perimeter based on demographic data.

j. Optionally, dispose of input data (e.g., video(s), image(s), etc.) in order to retain user privacy.

K. Output the estimated waistline perimeter or the adjusted estimated waistline perimeter for downstream processing (e.g., to help determine a body fat percentage estimate, etc.).

In one implementation, an a 3-D modelling technique to estimate a measurement of a portion of a subject body portion (e.g., waistline or other portion) can be determined. The 3-D modeling technique can include:

a. Joint Identification: e.g., programmatically determining where various human joints are in the body, and programmatically identifying regions (e.g., belly, thighs, arms, etc.).

b. Image segmentation: e.g., removing from a frame anything that isn't the subject.

c. Subject alignment: e.g., as the subject drifts up/down or side-to-side, center them within each frame.

d. With the background being removed, and the subject centered, generate a silhouette.

e. Based on the overall area taken up in the silhouette image by the subject, determine the subject's orientation relative to the camera.

f. (1) Additively building up 3-D points (voxels) using input silhouettes and known orientations.

f. (2) Based on timing of identified/known orientations (e.g., which provides an estimation of rotational speed), selecting various other angles to carve down initially created voxel model.

g. Measure the model's geometry at specific slices (such as the abdomen or thighs).

h. Dispose of input data (e.g., video(s), image(s), etc.) in order to retain user privacy.

Some implementations can include an ability to overcome inherent assumptions about body shape found in some conventional systems, with no pre-assumed models of the shape of the human body. Each person or human subject analyzed by the technique described herein has their own body shape determined according to an implementation of the technique described herein. Further, the disclosed method can execute on commodity hardware, which permits the advantages of the method, system and computer readable media presented herein to be realized on a device such as a mobile phone without any specialized hardware.

Some implementations can produce consistent results more quickly than other approaches (e.g., 3-5 minutes currently for a ~15 second video, with more room for improvement), while other methods such as photogrammetry may take at least an hour to accomplish less stable results.

FIG. 1 is a diagram of an example data flow and computational environment for 3-D body modeling in accordance with some implementations. The data flow and operational blocks are shown outside the phone/tablet 102 for illustration purposes, but the data flow and operations can be performed by the phone/tablet 102, an external computing system, or a combination of the above. As shown in FIG. 1, a smart phone or tablet 102 can capture and process raw video 104 to obtain metadata (if available) and separate the video into raw video frames 106.

The raw video frames 106 can be processed by a machine learning (or artificial intelligence) section 108 including three modules: a joint identification module 105 (e.g., to process a first frame of the raw video frames 106), an image segmentation module 103 (e.g., to process one or more frames of the raw video frames 106), and a subject alignment module 107 (e.g., to process one or more frames of the raw video frames 106). The modules (103, 105, and 107) can be machine learning models. Results of the three modules can be provided to a computer vision section 110 including a silhouette generator module 109 and a subject orientation module 111.

The results of the computer vision section 110 are supplied to a voxel generation system 112 that generates or builds a 3-D model of the subject (e.g., of the body of human subject). Body measurements 114 are determined and returned as results to the user or provided in an anonymous way to an external system (not shown).

In some implementations, the joint identification module 105 can include a machine learning system (e.g., a deep neural network) trained using annotated training data in which various points on the body are marked. After receiving frames from a video, the joint identification module 105 can locate points on the body.

In some implementations, the image segmentation module 103 can include a machine learning system (e.g., a deep neural network) trained using annotated training data in which the subject's pixels have been marked (as opposed to the non-subject elements within the frame). The image segmentation module 103 is operable to select the subject from input frames.

In some implementations, the subject alignment module 107 can include a machine learning system (e.g., a deep neural network) trained using annotated training data in which the head/neck is marked. After receiving frames from a video, the subject alignment module 107 is operable to locate those points within the video frames. Once the points are located across all input frames, the subject will be fixed in the same location (e.g., at a point that is derived from the first input frame). Thus, as the subject wobbles from side to side across the various input frames, the subject can be fixed in a single point for analysis.

In some implementations, the silhouette generation module 109 can build on the output from image segmentation. For example, the silhouette generation module 109, without a priori information about what pixels within a frame are included in the subject and what pixels are not, generates a binary mask, where one region represents the subject, and the other region represents everything else, taking into consideration the alignment data to create an adjusted silhouette (mask).

In some implementations, the subject orientation module 111, with the output from the silhouette generation 109, is operable to programmatically analyze the area of subject regions over the timeline of input frames. Local minimum and maximum values (e.g., representing how much space a subject is taking up within a frame), reflect subject orientation over time, with the maximums representing the subject at its broadest, and minimums representing the object at its narrowest. By correlating the subject orientation over time, the system can determine the rotational speed, and from that, derive which frames represent the various angles of subject rotation.

In some implementations, after having located, aligned, and silhouetted the subject across input frames, and having derived the subject's relative rotation in those frames the voxel generation module 112 is operable to build up a voxel representation of the subject by first finding subject depth (e.g., z-axis) from top to bottom (e.g., y-axis), by analyzing those frames representing local minimums (e.g., 90 degree rotations relative to front-face), and then creating an initial voxel representation from the silhouette of the first input frame. This initial voxel representation is blocky in nature. Using the known rotational angles from the other analyzed frames and their silhouettes, the initial model is carved down and rounded off, removing the initial blocky corners, outputting a mostly smooth model.

In some implementations, having located various joints within the body, the system is able to select and choose various regions on the body, such as the midriff, the thigh, etc. Having located the x and y coordinates within the model, the system can select the model at any targeted point, take a slice, find the area of that slice, then convert that area to various measurements (such as diameter) using the body measurement module 114. The outputted measurements and the generated 3-D model can then be used in downstream systems for various purposes (e.g., as inputs to systems for body mass index calculations or estimates, for custom apparel, for exercise and/or diet progress tracking, for health assessments, for insurance purposes, etc.).

Figure 2:
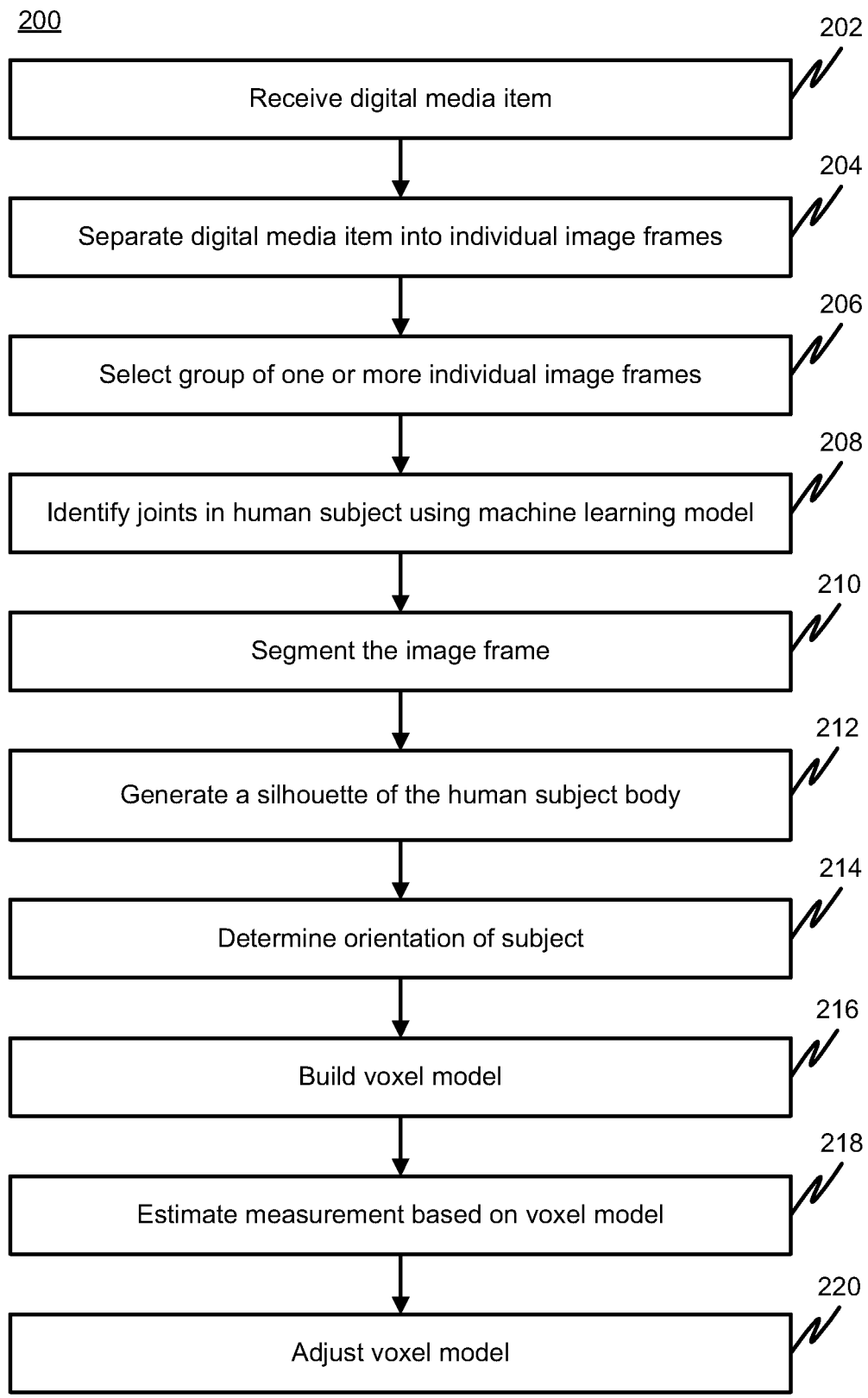
FIG. 2 is a flowchart showing an example body modeling method in accordance with some implementations.

FIG. 2 is a flowchart showing an example 3-D body modeling method 200 in accordance with some implementations. Processing begins at 202, where a digital media item is received as input. The digital media can include a digital video and/or one or more digital images. For example, the digital media can include a video captured by a cell phone. The video may follow a predetermined format such as having a subject face the camera with arms raised up and slowly turn in a circle to permit the camera to capture images of the front, sides and back of the subject. The media could include a raw video (e.g., a video not taken in the predetermined format) or be captured from an existing raw video. The digital media can also include additional associated information such as metadata. The metadata can include camera orientation, among other things, which can be used to adjust or correct the video for analysis. Processing continues to 204.

At 204, the digital media is separated into one or more individual image frames. For example, the digital video is separated into a plurality of individual image frames. Processing continues to 206.

At 206, a group of one or more image frames is selected from the plurality of individual image frames. Processing continues to 208.

At 208, for each individual image frame in the group of one or more image frames, a process is performed including identifying one or more joints of a human body subject image within the image frame, and identifying human body regions (e.g., belly, thighs, arms, etc.) within the image frame. In some implementations, a machine learning model can be used to identifying one or more joints of a human body subject image within the image frame. Processing continues to 210.

At 210, the process for each frame continues with segmenting the image frame to remove any image features that are not parts of the human body subject image and aligning the human body subject image within the image frame. Processing continues to 212.

At 212, a silhouette of the human body subject image within the image frame is generated. Processing continues to 214.

At 214, an orientation of the human body subject is determined based on the image frame. For example, determining one or more orientations of the human body subject based on the image frame can be based on an area of the human body subject image relative to the image frame. Processing continues to 216.

At 216, a voxel model of the human body subject is built based on the silhouette and the orientation of the human body subject image in one or more of the plurality of individual image frames. Processing continues to 218.

At 218, a measurement of at least one portion of the human body subject at one or more locations on the voxel model of the human body subject and based on the voxel model of the human body subject is estimated. For example, the measurement can include a measurement estimation of a user's belly, thighs, arms, etc. Processing continues to 220.

At 220, a voxel model of the human body subject can further include adjusting the voxel model based on a rotational speed of the human body subject, wherein the rotational speed is determined based on a timing of when the one or more orientations appear in the plurality of individual image frames.

In some implementations, computing the measurement of the at least one portion of the subject body can be further based on a measurement of the human body subject that has been received. In some implementations, the measurement can include height of the human body subject. In some implementations, the measurement can be received via a graphical user interface. The method can also optionally include disposing of the digital media and the plurality of individual image frames and retaining the voxel model. The method can optionally include transmitting the voxel model to a data collection system.

Figure 3:
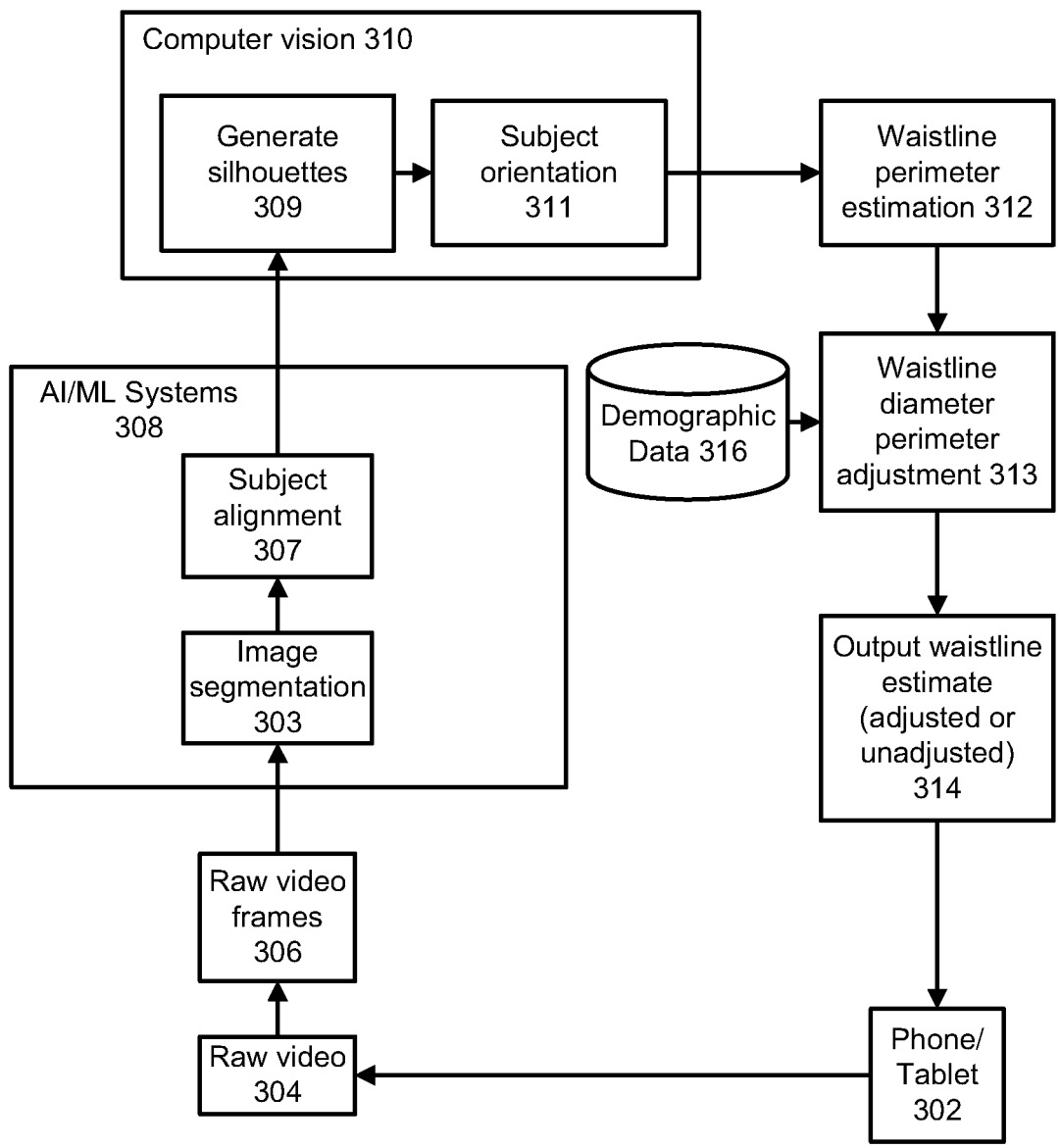
FIG. 3 is a diagram of an example data flow and computational environment for body modeling in accordance with some implementations.

FIG. 3 is a diagram of an example data flow and computational environment for 2-D body modeling in accordance with some implementations. The data flow and operational blocks are shown outside the phone/tablet 302 for illustration purposes, but the data flow and operations can be performed by the phone/tablet 302, an external computing system, or a combination of the above. As shown in FIG. 3, a smart phone or tablet 302 can capture and process raw video 304 to obtain metadata (if available) and separate the video into raw video frames 306.

The raw video frames 306 can be processed by a machine learning (or artificial intelligence) section 308 including one or more modules or models such as an image segmentation module 303 (e.g., to process one or more frames of the raw video frames 306), and a subject alignment module 307 (e.g., to process one or more frames of the raw video frames 306). The modules (303 and 307) can be machine learning models. Results of the three modules (303 and 307) can be provided to a computer vision section 310 including a silhouette generator module 309 and a subject orientation module 311.

The results of the computer vision section 310 are supplied to a waist ellipse estimate module 312 that determines a waistline location and projects an ellipse of the waistline of subject (e.g., waistline of the body of human subject). The estimated waistline perimeter can be passed to a waistline perimeter adjustment module 313. The waistline perimeter adjustment module 313 can optionally adjust the waistline perimeter estimate based on a demographic waistline perimeter determined by accessing demographic waistline database 316 using one or more demographic data items. The adjusted and/or unadjusted waistline perimeter estimate can be provided as output 314. The processing can be repeated. Waistline estimates can be determined and returned as results to the user (e.g., via a graphical user interface) or provided (e.g., in an anonymous way) to an external system (not shown) for use in other downstream operations such as estimating body fat percentage or the like.

In some implementations, the image segmentation module 303 can include a machine learning system (e.g., a deep neural network) trained using annotated training data in which the subject's pixels have been marked (as opposed to the non-subject elements within the frame). The image segmentation module 303 is operable to select the subject from input frames.

In some implementations, the subject alignment module 307 can include a machine learning system (e.g., a deep neural network) trained using annotated training data in which the head/neck is marked. After receiving frames from a video, the subject alignment module 307 is operable to locate those points within the video frames. Once the points are located across all input frames, the subject will be fixed in the same location (e.g., at a point that is derived from the first input frame). Thus, as the subject wobbles from side to side across the various input frames, the subject can be fixed in a single point for analysis.

In some implementations, the silhouette generation module 309 can build on the output from image segmentation. For example, the silhouette generation module 309, without a priori information about what pixels within a frame are included in the subject and what pixels are not, generates a binary mask, where one region represents the subject, and the other region represents everything else, taking into consideration the alignment data to create an adjusted silhouette (mask).

In some implementations, the subject orientation module 311, with the output from the silhouette generation 309, is operable to programmatically analyze the area of subject regions over the timeline of input frames. Local minimum and maximum values (e.g., representing how much space a subject is taking up within a frame), reflect subject orientation over time, with the maximums representing the subject at its broadest, and minimums representing the object at its narrowest. By correlating the subject orientation over time, the system can determine the rotational speed, and from that, derive which frames represent the various angles of subject rotation.

In some implementations, having located various joints within the body, the system is able to determine various regions on the body, such as waistline, midriff, thigh, etc. Having located the x and y coordinates within the model, the system can select the model at any targeted point, take a slice (e.g., a 2-D slice of an area of the waistline), find the area of that slice, then convert that area to various measurements (such as diameter) using the waistline estimation module 312. The outputted measurements and the generated 2-D model can then be used in downstream systems for various purposes (e.g., as inputs to systems for body fat percentage calculations or estimates that can be used for pother purposes (e.g., determining a corrected BMI), for custom apparel measurements, for exercise and/or diet progress tracking, for health assessments, for insurance purposes, etc.).

Figure 4:
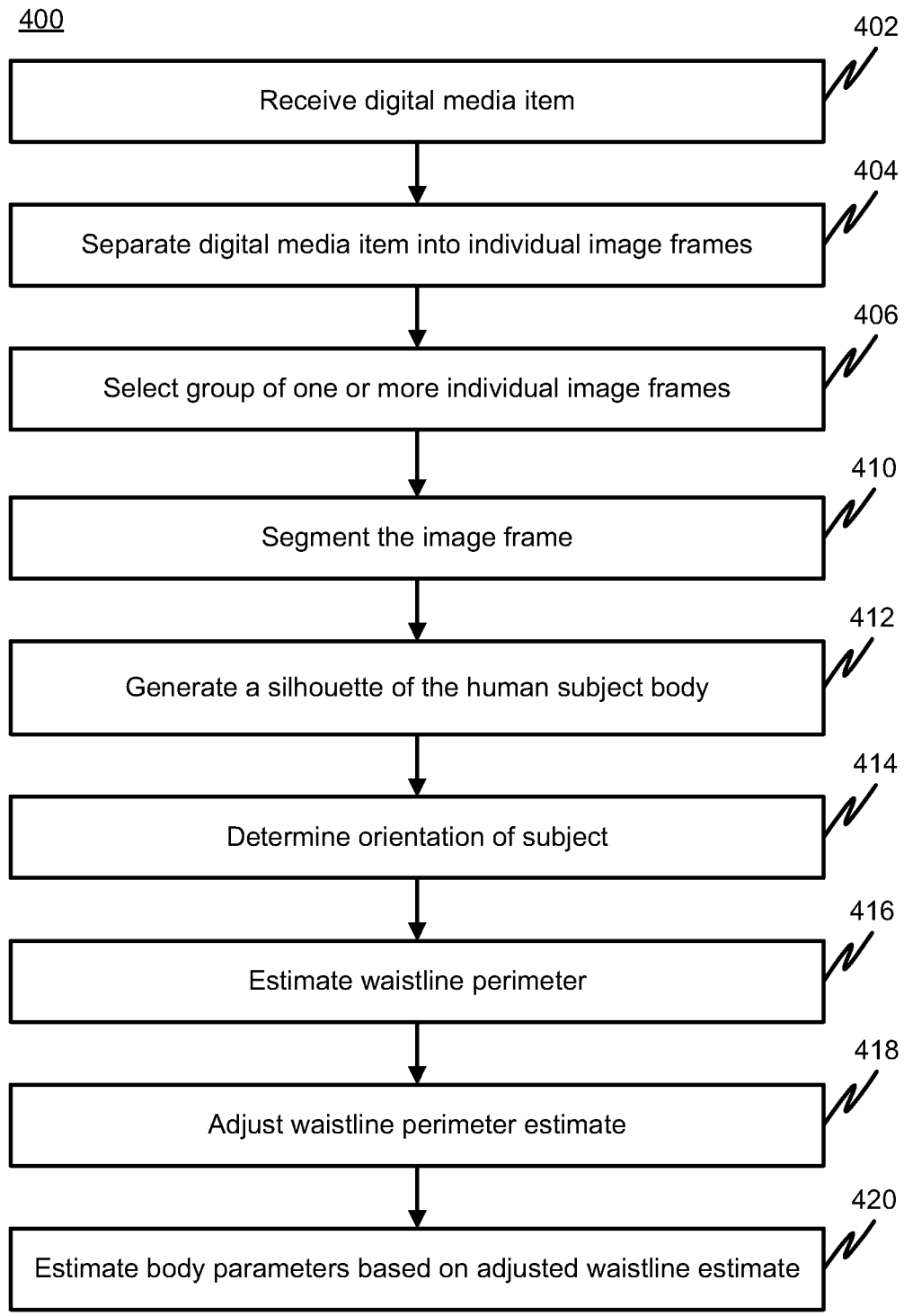
FIG. 4 is a flowchart showing an example body modeling method in accordance with some implementations.

FIG. 4 is a flowchart showing an example 2-D body modeling method 400 in accordance with some implementations. Processing begins at 402, where a digital media item is received as input. The digital media can include a digital video and/or one or more digital images. For example, the digital media can include a video captured by a cell phone. The video may follow a predetermined format such as having a subject face the camera with arms raised up and slowly turn in a circle to permit the camera to capture images of the front, sides and back of the subject. The media could include a raw video (e.g., a video not taken in the predetermined format) or be captured from an existing raw video. The digital media can also include additional associated information such as metadata. The metadata can include camera orientation, among other things, which can be used to adjust or correct the video for analysis. Processing continues to 404.

At 404, the digital media is separated into one or more individual image frames. For example, the digital video is separated into a plurality of individual image frames. Processing continues to 406.

At 406, a group of one or more image frames is selected from the plurality of individual image frames. Processing continues to 410.

At 410, the process for each frame continues with segmenting the image frame to remove any image features that are not parts of the human body subject image and aligning the human body subject image within the image frame. In some implementations, a machine learning model can be used to identify one or more areas within the image frame that contain a human body subject and for aligning the human body subject within one or more frames. Processing continues to 412.

At 412, a silhouette of the human body subject image within the image frame is generated. Processing continues to 414.

At 414, an orientation of the human body subject is determined based on the image frame. For example, determining one or more orientations of the human body subject based on the image frame can be based on an area of the human body subject image from frame to frame. In some implementations, orientation can be determined based on stochasticity of the subject's rotation. By determining orientation, a system can select only the frames that correspond to the 360 degree turn and remove other frames. In some implementations, this is done by selecting the frame in the beginning portion of the video when they are facing the camera right before the rotation and the frame at the end portion of the video right after the rotation. All frames before and after these two are trimmed. Processing continues to 416.

At 416, a model of the waistline of the human body subject is built based on the silhouette and the orientation of the human body subject image in one or more of the plurality of individual image frames. For example, the waistline area of the subject body in the images can be determined based on the outline of the subject body in one or more images (and optionally a measurement of the human body subject such as height). The waistline perimeter can then be projected from the plurality of individual image frames. The waistline projection can be based on a rotational speed of the human body subject, wherein the rotational speed is determined based on a timing of when the one or more orientations appear in the plurality of individual image frames.

In some implementations, the projection can include projecting an ellipse (or ellipse-like 2-D geometry). The projected ellipse can be fit to an ellipse equation. The ellipse equation can then be used to provide a diameter of the ellipse, which represent an estimated diameter of the waistline of the subject. In some implementations, the estimated waistline perimeter can be determined directly from the projection without fitting an ellipse equation to the projection. For example, in some implementations, individual (1D) waist diameters are projected onto a (2D) plane about the origin such that they can be fit to an ellipse using least-squares to minimize the parameters to determine an ellipse approximating the waistline perimeter (or circumference). This helps to remove noise from individual measurements. Processing continues to 418.

At 418, the waistline perimeter estimate is optionally adjusted. In some implementations, the estimated waistline perimeter can be optionally adjusted based on a demographic waistline estimate. The demographic waistline estimate can include an estimate retrieved and/or interpolated from demographic waistline data based on one or more demographic data points or demographic information items. For example, a use may input one or more demographic information items via a graphical user interface. The demographic information items can include one or more of gender, age, height, race, weight, diabetic status, other health status, etc. The demographic information items can be used to access demographic or statistical data representing waistline measurements associate with various demographic information items. For example, on average, a 45-year old male weighing 210 with no diabetes may have a waistline perimeter of approximately 86 cm. The demographic waistline data can be accessed using the demographic information items to retrieve and/or interpolate an estimated demographic waistline perimeter.

Once the demographic estimated waistline perimeter is obtained, it can be used to adjust the estimated waistline perimeter. For example, the demographic estimated waistline perimeter and the estimated waistline perimeter can be averaged together to determine the average (or mean) of the two. The estimated waistline perimeter and/or the adjusted estimated waistline perimeter can be provided as output. Processing continues to 420.

At 420, one or more body parameters can be estimated based on the adjusted or unadjusted estimated waistline perimeter. For example, the estimated waistline perimeter can be used to help determine body fat percentage, which can be used to help determine a corrected Body Mass Index (BMI) value for the subject. Optionally, other body measurements or demographic information can be used in conjunction with the estimated waistline perimeter to determine a body parameter such as body fat percentage.

In some implementations, computing the measurement of the at least one portion of the subject body can be further based on a measurement of the human body subject that has been received. In some implementations, the measurement can include height of the human body subject. In some implementations, the measurement and/or demographic information can be received via a graphical user interface. The method can also optionally include disposing of the digital media and the plurality of individual image frames and retaining the waistline estimates (e.g., in an anonymous form).

Figure 5:
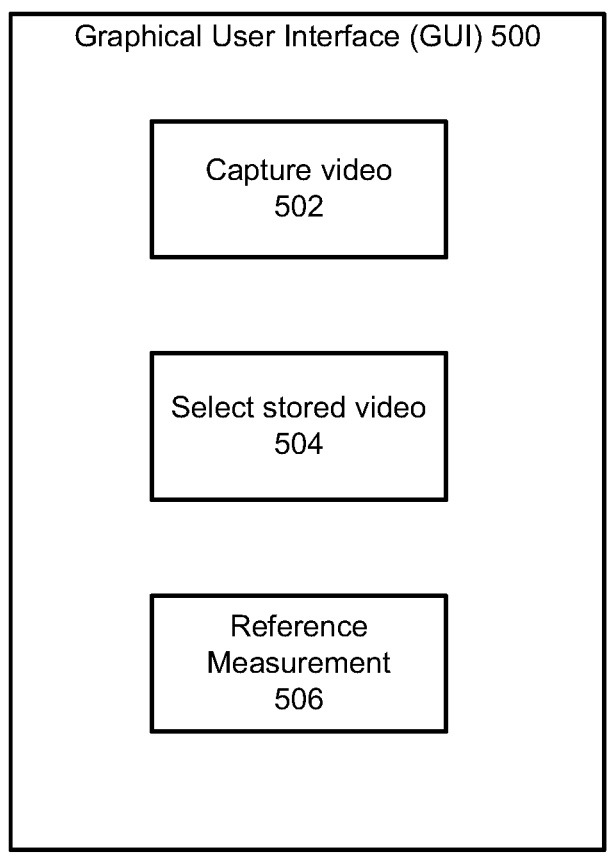
FIG. 5 is a diagram of an example body modeling graphical user interface in accordance with some implementations.

FIG. 5 is a diagram of an example body modeling graphical user interface 500 in accordance with some implementations. The interface 500 includes a control element 502 for taking a video, a control element 504 for selecting a stored video from within the device, and a control element 506 for inputting a reference measurement (e.g., height) of the user that is being measured.

In operation, a user can select 502 or 504 to cause video to be provided to an implementation of the modeling application. Control element 506 can be used to provide the reference measurement such as height. Once the video and reference measurement has been provided, the system can determine one or more anthropomorphic measurements (e.g., estimated waist circumference in cm or other units) that can be used as is or provided for other tasks, e.g., body fat percentage estimations, etc.

While the style of neural networks discussed herein may have existed in the general deep learning sphere for some time, the particular application and combination of neural networks described herein has not. Furthermore, an ability to gather proprietary training data specific to the use case of human body measurement is something that previous or current conventional systems may not include.

In addition, some implementations of the disclosed methodology find the orientation of the subject across various frames in a video. While examples are described herein in terms of measuring human subjects, this technique is not limited to human subjects. Video or images of any item or animal which can initially be discriminated using a neural network (e.g., for segmentation purposes) and which has a difference in width/depth can be provided as input to an implementation to generate models, such as a chair, a rotating tablet/phone, a vehicle, or even a rectangular building (e.g., with video being taken at a mostly constant distance from the object).

As mobile devices continue to incorporate RGBd cameras (e.g., which capture both color and depth information), the depth information can be incorporated into the technique described herein. Some implementations complement these other scanning and modeling technologies and can act as a filter to remove noise artifacts.

Modeling and measurement (e.g., 3-D body or 2-D waistline) based on media file input (e.g., digital video or images) can be performed using machine-learning techniques. For example, joint identification can be performed using a machine-learning model trained for joint identification and body area determining (e.g., determining belly, arm, or thigh location, etc.), image segmentation using machine-learning models trained for image segmentation (e.g., separating human subject image from other portions of an image), and/or subject alignment using models specially trained for aligning human body subject images, etc. For example, an implementation of the modeling and measurement technique (e.g., 3-D body or 2-D waistline) may implement machine learning, e.g., a deep learning model that can perform one or more of the functions discussed above. Machine-learning models may be trained using synthetic data, e.g., data that is automatically generated by a computer, with no use of user information. In some implementations, machine-learning models may be trained, e.g., based on sample data, for which permissions to utilize user data for training have been obtained expressly from users. For example, sample data may include video or images of the body of a user. Based on the sample data, the machine-learning model can determine joint location, segment the images or video frames, and align the human subject images within the frames.

In some implementations, machine learning may be implemented on server devices, on client devices (e.g., mobile phones), or on both. In some implementations, a simple machine learning model may be implemented on a client device (e.g., to permit operation of the model within memory, storage, and processing constraints of client devices) and a complex machine learning model may be implemented on a server device. If a user does not provide consent for use of machine learning techniques, such techniques are not implemented. In some implementations, a user may selectively provide consent for machine learning to be implemented only on a client device. In these implementations, machine learning may be implemented on the client device, such that updates to a machine learning model or user information used by the machine learning model are stored or used locally and are not shared to other devices such as a server device or other client devices.

In some implementations, a body modeling machine-learning application (e.g., 3-D body or 2-D waistline modeling) can include instructions that enable one or more processors to perform functions described herein, e.g., some or all of the method of FIG. 2 or 4.

In various implementations, a machine-learning application performing the functions described herein may utilize Bayesian classifiers, support vector machines, neural networks, or other learning techniques. In some implementations, a machine-learning application may include a trained model, an inference engine, and data. In some implementations, data may include training data, e.g., data used to generate trained model. For example, training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model, training data may include such user data. In implementations where users permit use of their respective user data, data may include permitted data such as images (e.g., videos, photos or other user-generated images), communications (e.g., e-mail; chat data such as text messages, voice, video, etc.), and documents (e.g., spreadsheets, text documents, presentations, etc.).

In some implementations, training data may include synthetic data generated for the purpose of training, such as data that is not based on user input or activity in the context that is being trained, e.g., data generated from computer-generated videos or images, etc. In some implementations, the machine-learning application excludes data. For example, in these implementations, the trained model may be generated, e.g., on a different device, and be provided as part of machine-learning application. In various implementations, the trained model may be provided as a data file that includes a model structure or form, and associated weights. An inference engine may read the data file for trained model and implement a neural network with node connectivity, layers, and weights based on the model structure or form specified in trained model.

A machine-learning application can also include a trained model. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, the trained model can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation may include applying a step/activation function to the adjusted weighted sum. In some implementations, the step/activation function may be a non-linear function. In various implementations, computation may include operations such as matrix multiplication. In some implementations, computations by the plurality of nodes may be performed in parallel, e.g., using multiple processors cores of a multicore processor, using individual processing units of a GPU, or special-purpose neural circuitry.

In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data, to produce a result.

For example, training may include applying supervised learning techniques. In supervised learning, the training data can include a plurality of inputs (e.g., a video or a set of images) and a corresponding expected output for each input (e.g., a model and/or measurement for a human body subject shown in the input). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

In another example, a model trained using unsupervised learning may cluster words based on the use of the words in input sentences. In some implementations, unsupervised learning may be used to produce knowledge representations, e.g., that may be used by a machine-learning application. In various implementations, a trained model includes a set of weights, or embeddings, corresponding to the model structure. In implementations where data is omitted, machine-learning application may include trained model that is based on prior training, e.g., by a developer of the machine-learning application, by a third-party, etc. In some implementations, the trained model may include a set of weights that are fixed, e.g., downloaded from a server that provides the weights.

The machine-learning application can also include an inference engine. The inference engine is configured to apply the trained model to data, such as application data, to provide an inference. In some implementations, the inference engine may include software code to be executed by a processor. In some implementations, the inference engine may specify circuit configuration (e.g., for a programmable processor, for a field programmable gate array (FPGA), etc.) enabling a processor to apply the trained model. In some implementations, the inference engine may include software instructions, hardware instructions, or a combination. In some implementations, the inference engine may offer an application programming interface (API) that can be used by an operating system and/or other applications to invoke the inference engine, e.g., to apply the trained model to application data to generate an inference.

A machine-learning application may provide several technical advantages. For example, when the trained model is generated based on unsupervised learning, the trained model can be applied by the inference engine to produce knowledge representations (e.g., numeric representations) from input data, e.g., application data. For example, a model trained for image analysis may produce representations of images that are substantially smaller in size (e.g., 1 KB) than input images (e.g., 10 MB). In some implementations, such representations may be helpful to reduce processing cost (e.g., computational cost, memory usage, etc.) to generate an output (e.g., a 3-D model, one or more estimated or predicted measurements such as waistline, etc.). In some implementations, such representations may be provided as input to a different machine-learning application that produces output from the output of the inference engine. In some implementations, knowledge representations generated by the machine-learning application may be provided to a different device that conducts further processing, e.g., over a network. In such implementations, providing the knowledge representations rather than the images may provide a substantial technical benefit, e.g., enable faster data transmission with reduced cost. In another example, a model trained for 3-D modeling may produce 3-D models and/or measurements from input media (e.g., one or more videos or images) and an input measurement (e.g., height). In yet another example, a model trained for 2-D waistline modeling may produce a 2-D waistline model and/or measurement from input media (e.g., one or more videos or images), an input measurement (e.g., height), and/or an estimate from demographic data about a subject.

In some implementations, the machine-learning application may be implemented in an offline manner. In these implementations, the trained model may be generated in a first stage and provided as part of the machine-learning application. In some implementations, the machine-learning application may be implemented in an online manner. For example, in such implementations, an application that invokes the machine-learning application (e.g., the operating system, and/or one or more other applications) may utilize an inference produced by the machine-learning application, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update the trained model, e.g., to update embeddings for the trained model.

In some implementations, the machine-learning application may be implemented in a manner that can adapt to particular configuration of a device on which the machine-learning application is executed. For example, the machine-learning application may determine a computational graph that utilizes available computational resources, e.g., the processor. For example, if the machine-learning application is implemented as a distributed application on multiple devices, the machine-learning application may determine computations to be carried out on individual devices in a manner that optimizes computation. In another example, the machine-learning application may determine that the processor includes a GPU with a particular number of GPU cores (e.g., 1000) and implement the inference engine accordingly (e.g., as 1000 individual processes or threads).

In some implementations, the machine-learning application may implement an ensemble of trained models (e.g., joint identification, image segmentation, and subject alignment). For example, the trained model may include a plurality of trained models that are each applicable to same or different input data. In these implementations, the machine-learning application may choose a particular trained model, e.g., based on available computational resources, success rate with prior inferences, etc. In some implementations, the machine-learning application may execute the inference engine such that a plurality of trained models is applied. In these implementations, the machine-learning application may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by the operating system or one or more applications.

In different implementations, the machine-learning application can produce different types of outputs. For example, the machine-learning application can provide representations or clusters (e.g., numeric representations of input data), models (e.g., a 3-D voxel model of a human subject), measurement (e.g., measurements of one or more locations in a voxel model), images (e.g., generated by the machine-learning application in response to input), audio or video (e.g., in response to an input video, the machine-learning application may produce a model or measurements. In some implementations, the machine-learning application may produce an output based on a format specified by an invoking application, e.g. the operating system or one or more applications. In some implementations, an invoking application may be another machine-learning application. For example, such configurations may be used in generative adversarial networks, where an invoking machine-learning application is trained using output from the machine-learning application and vice-versa.

Any of the above-mentioned software in memory can alternatively be stored on any other suitable storage location or computer-readable medium. In addition, the memory (and/or other connected storage device(s)) can store one or more videos, one or more image frames, one or more 3-D models, one or measurements, and/or other instructions and data used in the features described herein. The memory and any other type of storage (magnetic disk, optical disk, magnetic tape, or other tangible media) can be considered "storage" or "storage devices."

An I/O interface can provide functions to enable interfacing a device with other systems and devices. Interfaced devices can be included as part of a device or can be separate and communicate with the device. For example, network communication devices, storage devices, and input/output devices can communicate via the I/O interface. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to the I/O interface can include one or more display devices that can be used to display content, e.g., images, video, and/or a user interface of an output application as described herein. A display device can be connected to a device via local connections (e.g., display bus) and/or via networked connections and can be any suitable display device. The display device can include any suitable display device such as an LCD, LED, or plasma display screen, CRT, television, monitor, touchscreen, 3-D display screen, or other visual display device. For example, the display device can be a flat display screen provided on a mobile device, multiple display screens provided in a goggles or headset device, or a monitor screen for a computer device.

The I/O interface can interface to other input and output devices. Some examples include one or more cameras which can capture videos or images. Some implementations can provide a microphone for capturing sound (e.g., as a part of captured images, voice commands, etc.), audio speaker devices for outputting sound, or other input and output devices.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., images of a user or person associated with a user, user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user can be provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined (e.g., a voxel model is stored, and video or images of the user are discarded). As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

Figure 6:
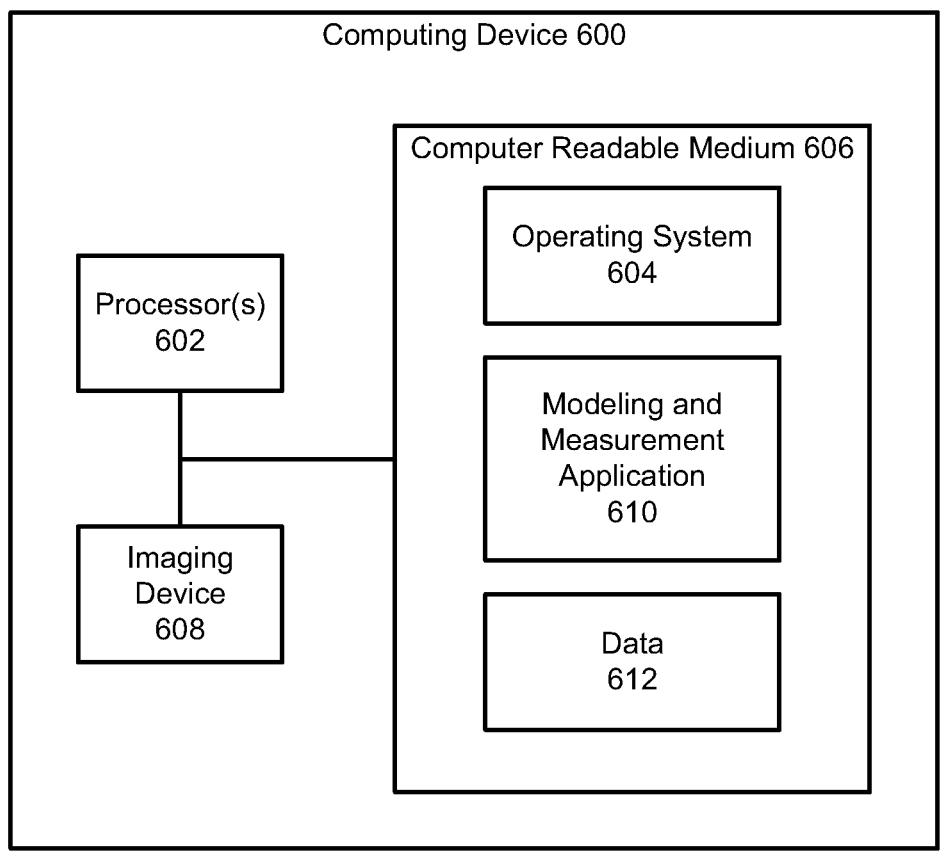
FIG. 6 is a diagram of an example computing device configured for body modeling in accordance with some implementations.

FIG. 6 is a diagram of an example computing device 600 in accordance with at least one implementation. The computing device 600 includes one or more processors 602, a nontransitory computer readable medium 606 and an imaging device 608. The computer readable medium 406 can include an operating system 604, an application 610 (e.g., for 3-D body modeling and measurement estimation or for 2-D body area modeling and measurement estimation), and a data section 612 (e.g., for storing media such as video or image files, machine learning models, voxel models, measurement information, demographic data, etc.).

In operation, the processor 602 may execute the application 610 stored in the computer readable medium 606. The application 610 can include software instructions that, when executed by the processor, cause the processor to perform operations for 3-D or 2-D modeling and measurement determination in accordance with the present disclosure (e.g., performing one or more of the steps or sequence of steps described above in connection with FIG. 2 or 4).

The application program 610 can operate in conjunction with the data section 612 and the operating system 604.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C #.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multicore, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and image processing arts.

Moreover, embodiments of the disclosed method, system, and computer readable media (or computer program product) can be implemented in software executed on a programmed general-purpose computer, a special purpose computer, a microprocessor, a network server or switch, or the like.

It is, therefore, apparent that there is provided, in accordance with the various embodiments disclosed herein, methods, systems and computer readable media for computerized modeling of a subject (e.g., a human body subject) based on input media (e.g., video from a mobile device or other device) and/or input data (e.g., height or other measurements, demographic data, etc.).

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method comprising:
receiving, at one or more processors, a video that includes a plurality of image frames in a sequence as input;
separating, using the one or more processors, the video into a plurality of individual image frames;
selecting a group of one or more image frames from the plurality of individual image frames;
for each individual image frame in the group of one or more image frames, performing operations including:
identifying human body regions corresponding to a human body subject within the image frame;
segmenting the image frame to remove image features that are not parts of the human body subject;
aligning the human body subject within the image frame, wherein the aligning includes adjusting for vertical or horizontal movement of the human body subject from one frame to another and centering the human body subject image within the frame;
generating a silhouette of the human body subject within the image frame; and
determining one or more orientations of the human body subject based on the image frame;
determining a location of a waistline of the human body subject in the image frame based on the one or more orientations;
projecting an ellipse from the human body subject based on a rotation of the silhouette of the human body subject;
fitting an ellipse equation to the projected ellipse;
determining an estimated waistline perimeter for the human body subject based on the ellipse equation;
receiving one or more demographic information items corresponding to the human body subject;
retrieving an estimated demographic waistline perimeter from a data store based on the one or more demographic information items; and
generating an adjusted estimated waistline perimeter by adjusting the estimated waistline perimeter based on the estimated demographic waistline perimeter.

2. The method of claim 1, wherein projecting the ellipse includes projecting one or more individual waist diameters onto a plane about an origin such that the one or more individual waist diameters can be fit to an ellipse using least-squares to determine an ellipse approximating waistline perimeter.

3. The method of claim 1, wherein determining one or more orientations of the human body subject is based on an area of the human body subject in a first image frame and a second image frame.

4. The method of claim 1, wherein aligning includes adjusting for vertical or horizontal movement of the human body subject image between a plurality of frames of the video and centering the human body subject image within the frame.

5. The method of claim 1, wherein the adjusting includes determining a mathematical mean of the estimated waistline perimeter and the estimated demographic waistline perimeter.

6. The method of claim 1, wherein determining a location of a waistline of the human body subject is based a measurement of the human body subject.

7. The method of claim 6, wherein the measurement includes height of the human body subject.

8. The method of claim 7, wherein the measurement is received via a graphical user interface.

9. The method of claim 1, further comprising deleting the video and the plurality of individual image frames and retaining the estimated waistline perimeter or adjusted estimated waistline perimeter.

10. A system comprising:
a memory; and
a processing device, coupled to the memory, the processing device configured to perform operations including:
receiving, at one or more processors, a video that includes a plurality of image frames in a sequence as input;
separating, using the one or more processors, the video into a plurality of individual image frames;
selecting a group of one or more image frames from the plurality of individual image frames;
for each individual image frame in the group of one or more image frames, performing operations including:
identifying human body regions corresponding to a human body subject within the image frame;
segmenting the image frame to remove image features that are not parts of the human body subject;
aligning the human body subject within the image frame, wherein the aligning includes adjusting for vertical or horizontal movement of the human body subject from one frame to another and centering the human body subject image within the frame;
generating a silhouette of the human body subject within the image frame; and
determining one or more orientations of the human body subject based on the image frame;
determining a location of a waistline of the human body subject in the image frame based on the one or more orientations;
projecting an ellipse from the human body subject based on a rotation of the silhouette of the human body subject;
fitting an ellipse equation to the projected ellipse; and
determining an estimated waistline perimeter for the human body subject based on the ellipse equation,
wherein projecting the ellipse includes projecting one or more individual waist diameters onto a plane about an origin such that the one or more individual waist diameters can be fit to an ellipse using least-squares to determine an ellipse approximating waistline perimeter.

11. The system of claim 10, wherein aligning includes adjusting for vertical or horizontal movement of the human body subject image between a plurality of frames of the video and centering the human body subject image within the frame.

12. The system of claim 10, wherein the operations further include:
receiving one or more demographic information items corresponding to the human body subject;

retrieving an estimated demographic waistline perimeter from a data store based on the one or more demographic information items; and generating an adjusted estimated waistline perimeter by adjusting the estimated waistline perimeter based on the estimated demographic waistline perimeter.

13. The system of claim 12, wherein the operations further include deleting the video and the plurality of individual image frames and retaining the estimated waistline perimeter or adjusted estimated waistline perimeter.

14. A non-transitory computer-readable medium comprising instructions that, responsive to execution by a processing device, cause the processing device to perform operations comprising:

receiving, at one or more processors, a video that includes a plurality of image frames in a sequence as input;

separating, using the one or more processors, the video into a plurality of individual image frames;

selecting a group of one or more image frames from the plurality of individual image frames;

for each individual image frame in the group of one or more image frames, performing operations including:

identifying human body regions corresponding to a human body subject within the image frame;

segmenting the image frame to remove image features that are not parts of the human body subject;

aligning the human body subject within the image frame, wherein the aligning includes adjusting for vertical or horizontal movement of the human body subject from one frame to another and centering the human body subject image within the frame;

generating a silhouette of the human body subject within the image frame; and determining one or more orientations of the human body subject based on the image frame;

determining a location of a waistline of the human body subject in the image frame based on the one or more orientations;

projecting an ellipse from the human body subject based on a rotation of the silhouette of the human body subject;

fitting an ellipse equation to the projected ellipse; and determining an estimated waistline perimeter for the human body subject based on the ellipse equation, wherein projecting the ellipse includes projecting one or more individual waist diameters onto a plane about an origin such that the one or more individual waist diameters can be fit to an ellipse using least-squares to determine an ellipse approximating waistline perimeter.

15. The non-transitory computer-readable medium of claim 14, wherein aligning includes adjusting for vertical or horizontal movement of the human body subject image between a plurality of frames of the video and centering the human body subject image within the frame.

16. The non-transitory computer-readable medium of claim 14, wherein the operations further include:

receiving one or more demographic information items corresponding to the human body subject;

retrieving an estimated demographic waistline perimeter from a data store based on the one or more demographic information items; and generating an adjusted estimated waistline perimeter by adjusting the estimated waistline perimeter based on the estimated demographic waistline perimeter.

17. The non-transitory computer-readable medium of claim 16, wherein the operations further include deleting the video and the plurality of individual image frames and retaining the estimated waistline perimeter or adjusted estimated waistline perimeter.

* * * * *